(12) United States Patent
Ashbrook

(10) Patent No.: US 7,337,503 B1
(45) Date of Patent: Mar. 4, 2008

(54) WINDOW SHADE LEVELING DEVICES

(76) Inventor: Richard B. Ashbrook, 18720 Oriente Dr., Yorba Linda, CA (US) 92886

( * ) Notice: Subject to any disclaimer, the term of this patent is extended or adjusted under 35 U.S.C. 154(b) by 47 days.

(21) Appl. No.: 11/371,115

(22) Filed: Mar. 8, 2006

Related U.S. Application Data

(60) Provisional application No. 60/594,069, filed on Mar. 8, 2005.

(51) Int. Cl.
*F16G 11/00* (2006.01)
(52) U.S. Cl. .................................. 24/115 G; 24/136 R
(58) Field of Classification Search ............. 24/115 G, 24/136 R, 115 H; 439/817, 818
See application file for complete search history.

(56) References Cited

U.S. PATENT DOCUMENTS 3,806,860 A * 4/1974 Flammini .................. 439/817
4,288,891 A    9/1981 Boden
5,197,166 A * 3/1993 Meier et al. ............... 24/115 G
5,323,514 A * 6/1994 Masuda et al. ........... 24/115 G
5,365,641 A * 11/1994 Watanabe et al. ......... 24/115 G
5,611,118 A * 3/1997 Bibbee ....................... 24/298
6,648,049 B2    11/2003 Bryant

* cited by examiner

*Primary Examiner*—James R. Brittain
(74) *Attorney, Agent, or Firm*—Blakely Sokoloff Taylor & Zafman LLP

(57) ABSTRACT

Window shade adjustment and leveling devices for controllably grasping a window shade cord for setting and leveling a window shade. The devices have a body with a button member extending into the body and having protrusions locking therein using a form of bayonet lock. Holes in the body and button member align when the button member is depressed relative to the body of insertion of the cord, with the cord being locked in position relative to the device when the button member is released. Preferably the holes in the body are specially configured to increase the gripping strength of the device, with the protrusions on the button member aiding in the gripping.

12 Claims, 2 Drawing Sheets

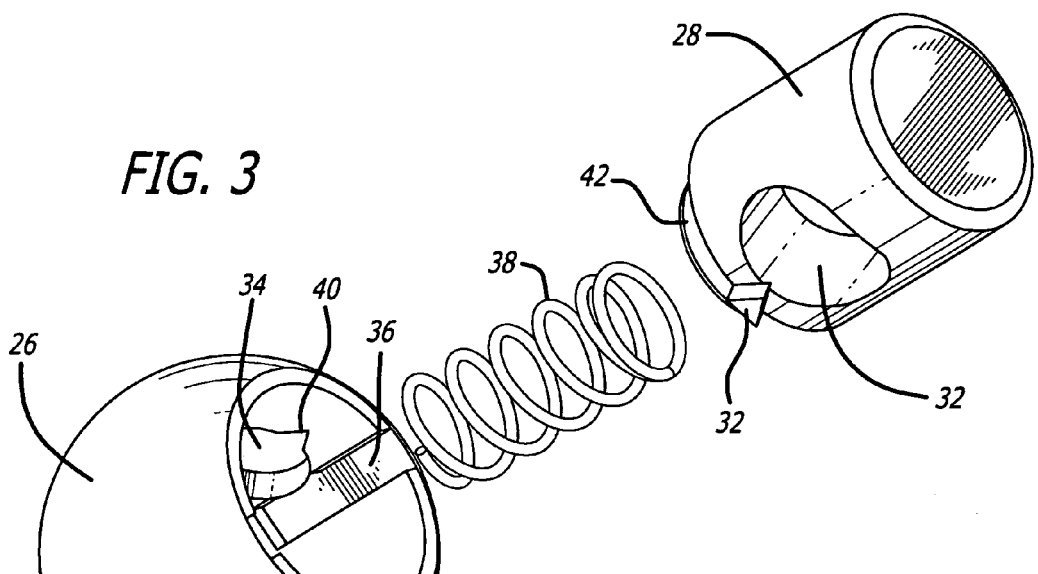
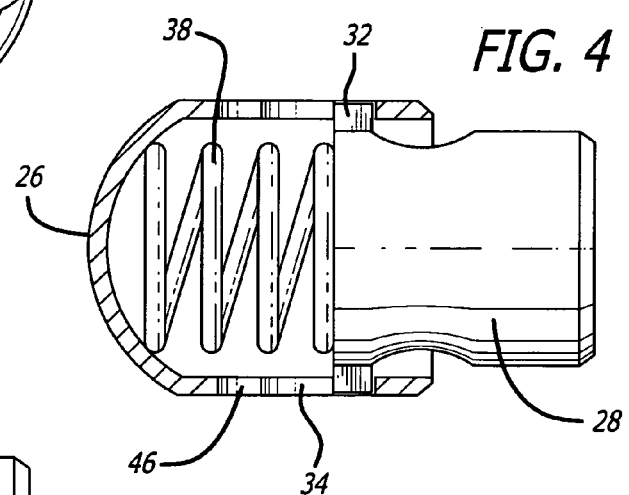
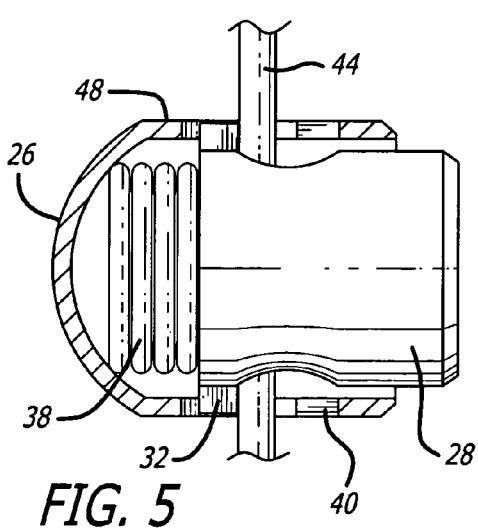
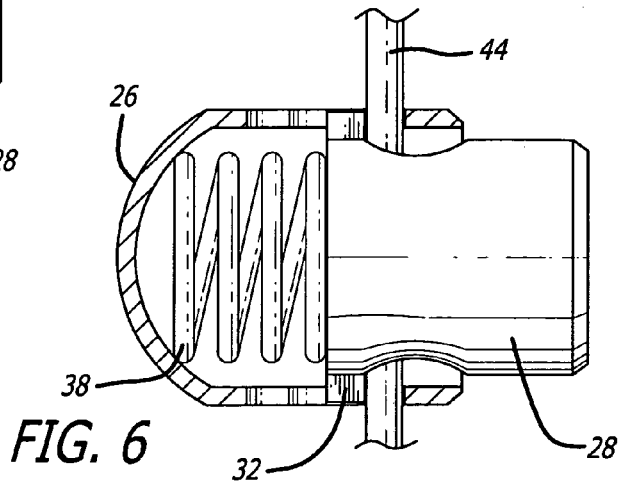

WINDOW SHADE LEVELING DEVICES

CROSS-REFERENCE TO RELATED APPLICATION

This application claims the benefit of U.S. Provisional Patent Application No. 60/594,069 filed Mar. 8, 2005.

BACKGROUND OF THE INVENTION

1. Field of the Invention

The present invention relates to the field of window shades.

2. Prior Art

Certain types of window shades have cords on the shade that are used to raise the shades, typically a manufacturer and/or installer, who would level the shade by tying evenly the cords to the bottom rings of the shade. This procedure provides satisfactory results, though can be both time consuming and frustrating, as tying the first cord at the desired height is relatively straightforward, but tying the second cord and successive cords at the exact position to obtain a level shade can be an elusive task. Further, adjusting the shade by an inexperienced homeowner and still obtaining a level shade can be even more difficult.

Also known in the prior art are plastic cord stoppers or cord locks frequently used on drawstrings to lock the drawstrings of cloth bags and the like, once the drawstrings are pulled to close or secure whatever item the drawstrings are on. These plastic cord stoppers or cord locks are generally characterized by a body having a button member fitting therein, with a coil spring between the body and the bottom of the button member. When the button member is depressed against the spring, a hole through the body member and a hole through the button member are generally aligned, allowing the passage of the cord therethrough. Release of the button member, however, allows the spring to force the button member upward to pinch the cord between the body and the button member.

Cord stoppers of this general configuration for stopping single cords or having two such sets of openings in the body and button member for stopping two cords in the same assembly are well known. The cords, of course, can be released by squeezing between the button member and the body to again align the holes, after which the cord freely passes through and can be adjusted with respect to the aligned holes in the stopper.

Such a stopper could theoretically be useful as a stopper for window shade cords. However, the commercially available stoppers are generally too large for this application, as the typical window shade cord is much finer than the line or rope for which such stoppers are designed to be used. Also, when such stoppers are scaled to a proper size for a window cord stopper, the stopper will not adequately grasp the window shade cord to avoid slipping on the cord during or after initial adjustment. Consequently, prior to the present invention, devices of this general character were not used for shade adjustment.

BRIEF DESCRIPTION OF THE DRAWINGS

FIG. 3 is an exploded view of the shade adjuster of FIGS. 1 and 2.

FIG. 4 is a partial cross section of the shade adjuster of the preferred embodiment as assembled, but not in use.

FIG. 5 is a partial cross section of the shade adjuster of the preferred embodiment as depressed for inserting a shade cord into the adjuster.

FIG. 6 is a partial cross section of the shade adjuster of the preferred embodiment shown gripping a shade cord during use.

DETAILED DESCRIPTION OF THE PREFERRED EMBODIMENTS

Figure 1:
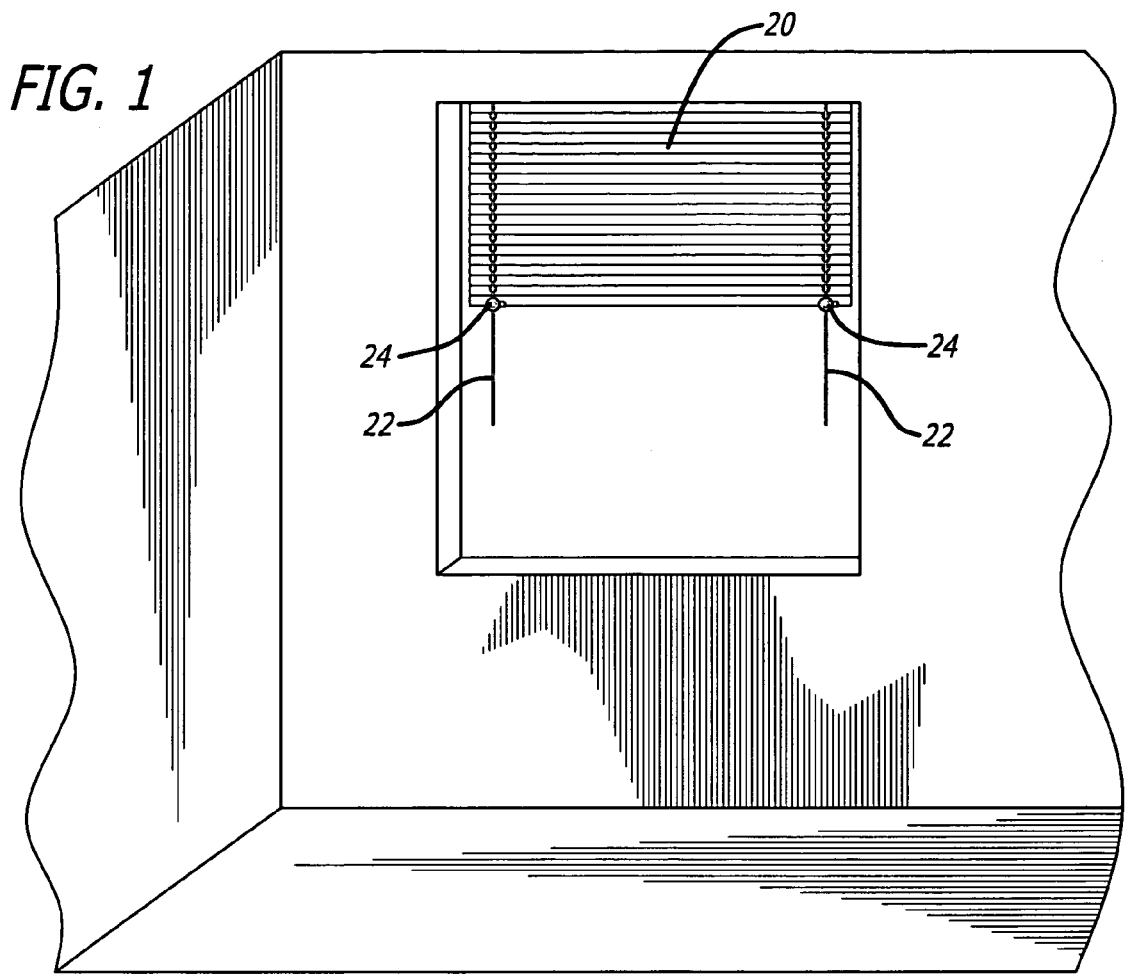
FIG. 1 is an illustration of a shade using a preferred embodiment of the present invention shade adjusters or levelers.

First referring to FIG. 1, a schematic diagram of a window shade 20 with leveling cords 22 may be seen. Also shown in this Figure are the leveling or adjustment devices 24 of the present invention.

Figure 2:
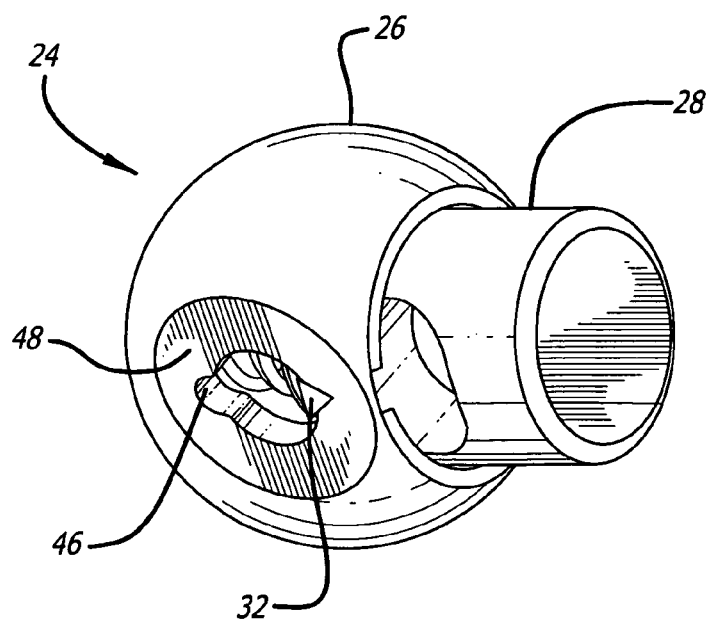
FIG. 2 is a perspective view of the shade adjuster of FIG. 1.

A perspective of the adjustment devices 24 may be seen in FIG. 2. These devices are comprised of an approximately spherical body 26 and a button member 28 extending into an opening in the body 26. As may be seen in FIG. 3, the button member 28 has a hole or opening 30 therethrough, with a protrusion 32 on each side of the button member adjacent the hole 30. Also as may be seen in FIG. 2, and particularly in FIG. 3, the body 26 has holes 34 therein extending through each side of the body with a respective slot 36 extending into the body adjacent each hole 34 and intersecting the edge of the hole. The slots 36 allow the protrusions 32 to slide within the slots when the button member 28 is aligned therewith, though when the button member is appropriately inserted, the button member may be rotated in a counterclockwise direction with respect to the body 26 to allow the protrusions 32 to then align with the holes 34 in the body 26. A spring 38, entrapped between the body and button member 28, applies a spring force attempting to eject the button member 28 from the body 26, though the protrusions 32 will be caught by the top of holes 34 in the body 26 to retain the assembly in the position shown in FIG. 2. Thus the button member is locked within the body by a form of bayonet lock. In the preferred embodiment, the body has flats 48 on its outer surface surrounding holes 34.

It should be noted from FIGS. 2 and 3 that in the preferred embodiment, the protrusions 32 have a V-shape and fit within V-grooves 40 at the top of holes 34 in the body. As shall subsequently be seen, the purpose of the V-groove 40 in the body 26 and the shape of the protrusions 32 is to wedge a shade cord into the V-groove, which has been found to provide better retention of the shade cord than can be obtained by merely pinching the shade cord without such a V-groove, and of course, without the protrusions. The protrusions also have the advantage of keeping the assembly together, avoiding the inadvertent disassembly, loss of parts, etc.

FIG. 4 shows a partial cross section of the adjustment device when assembled. Here the spring 38 is pushing the button member 28 to the right, forcing the protrusions 32 on the button member 28 into the V-grooves in holes 34 of the body 26 (see also FIG. 3). In that regard, the spring 38 is retained in the centered position by a concentric protrusion 42 at the bottom of the button member 28 fitting within the end coil of the spring.

When the button member 28 is depressed relative to the body 26, spring 38 will be depressed and the hole 30 in the button member 28 and the holes 34 in the body 26 may be sufficiently aligned to easily pass the window shade cord 44 there through, as shown in FIG. 5. In that regard, in the preferred embodiment the body 26 also has a groove or recess 46 opposite the V-grooves 40 in holes 34 to allow depression of the button member 28 until the protrusions 32 extend into grooves 46, thereby providing best alignment of the holes in the button member 28 and body 26. When the button member is released as in FIG. 6, cord 44 will be forced into the V-grooves 40 and the body 26 by protrusions 32, providing a cord retention greater than achievable without the wedging action of the V-grooves and protrusions. Thus a very small, inexpensive adjustment device may be achieved that is easily adjusted and reliably retains a window shade cord after adjustment to allow quick and easy window shade leveling by both installer and homeowner, without the cumbersome and inaccurate tying of the window shade cord.

While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A window shade adjustment device comprising:
   a body having a first opening extending all the way through the body in a first direction;
   the body having a second opening extending perpendicular to the first direction and part way through the body from a top of the body to a position between the first opening and a bottom of the body opposite the top of the body;
   the second opening including opposed slots extending from the top of the body to at least the first opening and intersecting the first opening at a side thereof;
   a button member having inner and outer ends, the button member sliding within the second opening and having opposed projections adjacent the inner end thereof each fitting within a respective one of the slots, the button member being rotatable after being inserted into the body so that the opposed projections extend into the first opening, and when so rotated, the projections will prevent withdrawal of the button member from the body by engagement of the projections with a wall of the first opening;
   the button member having a third opening there-through aligned with the projections and located between the projections and the outer end, the outer end projecting out from the top of the body; and,
   a spring disposed between the inner end of the button member and the body and encouraging the button member out of the top of the body.

2. The device of claim 1 wherein the third opening is adjacent the projections.

3. The device of claim 2 wherein the first opening includes a groove in an edge of the first opening closest to the top of the body.

4. The device of claim 3 wherein the projections have a cross section fitting within the groove.

5. The device of claim 4 wherein the projections and the groove are configured to pinch a window shade cord passing through the first opening into the groove when the button member is not being depressed.

6. The device of claim 3 wherein the first opening includes a depression in the edge of the first opening closest to the bottom of the body for receiving the projections when the button member is depressed.

7. The device of claim 1 wherein the second opening is a cylindrical opening.

8. The device of claim 1 wherein the body is approximately spherical with flats in the regions where the first opening passes through an outer wall of the body.

9. The device of claim 1 wherein at least one of the body and button member is configured to center the spring within the second opening.

10. A window shade adjustment device comprising:
    a body having a first opening extending all the way through the body in a first direction;
    the body having a second opening extending perpendicular to the first direction and extending part way through the body from a top of the body to a position between the first opening and a bottom of the body opposite the top of the body, the second opening including opposed slots extending from the top of the body to at least the first opening and intersecting the first opening at a side thereof;
    a button member having inner and outer ends, the button member sliding within the second opening and having opposed projections adjacent the inner end thereof each fitting within a respective one of the slots, the button member being rotatable after being inserted into the body so that the opposed projections extend into the first opening, and when so rotated, the projections will prevent withdrawal of the button member from the body by engagement of the projections with a wall of the first opening;
    the button member having a third opening there-through aligned with the projections and located between the projections and the outer end, the outer end projecting out from the top of the body; and,
    a spring disposed between the inner end of the button member and the body and encouraging the button member out of the top of the body;
    the third opening being adjacent the projections, the first opening including a groove in an edge of the first opening closest to the top of the body, the projections have a cross section fitting within the groove, the projections and the groove being configured to pinch a window shade cord passing through the first opening into the groove when the button member is not being depressed, the body being approximately spherical with flats in the regions where the first opening passes through an outer wall of the body.

11. The device of claim 10 wherein the first opening includes a depression in the edge of the first opening closest to the bottom of the body for receiving the projections when the button member is depressed.

12. The device of claim 10 wherein the second opening is a cylindrical opening.

* * * * *